June 1, 1937.  J. J. TOMALIS  2,082,085
SCREW MANUFACTURE
Filed Aug. 5, 1936
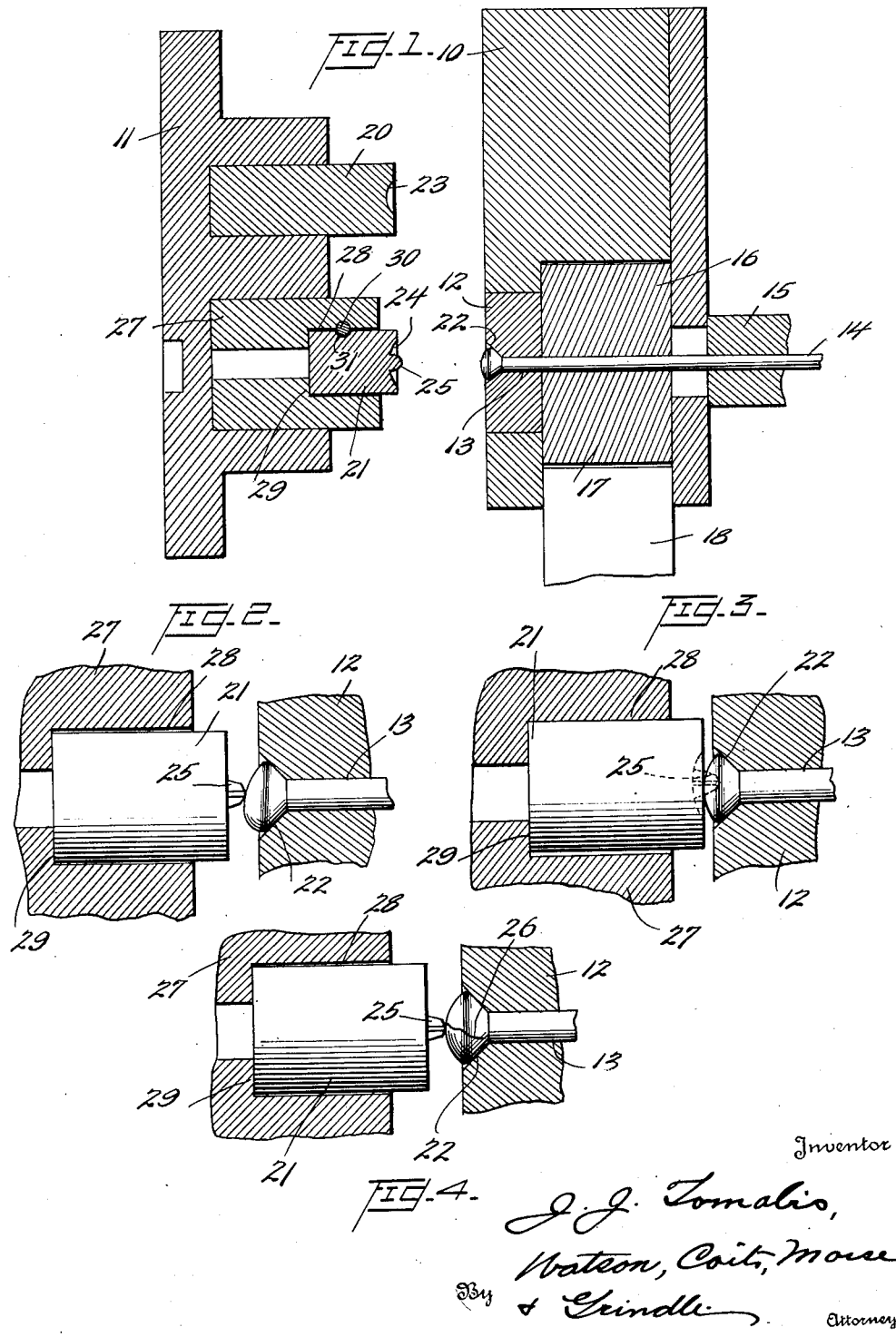
Inventor
J. J. Tomalis,
By Watson, Coit, Morse
& Grindle
Attorney Patented June 1, 1937

2,082,085

UNITED STATES PATENT OFFICE 2,082,085

SCREW MANUFACTURE

Joseph John Tomalis, Providence, R. I., assignor to American Screw Company, Providence, R. I., a corporation of Rhode Island Application August 5, 1936, Serial No. 94,435

10 Claims. (Cl. 10—7)

This invention relates to screw manufacture and more particularly to apparatus for and a method of manufacturing headed blanks for screws. Although the invention is not so limited, it is primarily intended for the manufacture of blanks for screws with pierced or recessed heads and the invention is herein so described.

It is a general object of the present invention to provide novel and improved apparatus for and a method of heading and recessing screw blanks formed of suitable wire.

More particularly, it is an object of the invention to provide, in screw making apparatus, a head forming and recessing punch, the operative portion of which is floatingly mounted.

A further object of the invention consists in the provision of a screw blank forming machine including a stationary die having a portion to form the undersurface of a screw head on a wire fed through the die and a pair of punches, the first of which roughly forms the head, and the second of which finishes and pierces the head to provide a screw driver receiving recess and in which the second punch is so mounted that it is permitted to move with or compensate for inequalities and irregularities in the semi-finished head formed by the first punch as they are forced against the die by the second punch in forming the head to final shape.

One of the features of the invention consists in mounting the second or head finishing and piercing punch in an adapter which is secured to the reciprocating gate so that there is clearance in all directions between the punch and the adapter permitting the punch to move within limits to adjust itself to faults in the wire or in the partially formed head.

Other and further features and objects of the invention will be more apparent to those skilled in the art upon a consideration of the accompanying drawing and following specification wherein is disclosed a single exemplary embodiment of the invention with the understanding that it is subject to such changes and variations as fall within the scope of the appended claims without departing from the spirit of the invention.

In said drawing:

Figure 1 is a longitudinal section through the die and punch portions of both the stationary and movable parts of a conventional cold-heading screw blank machine showing the present invention applied thereto;

Figure 2 is a view on an enlarged scale of the second or finishing and piercing punch approaching a semi-finished screw head which has been eccentrically formed;

Figure 3 is a view similar to Figure 2 showing the piercing punch partially embedded in the head; and Figure 4 is a view similar to Figure 2 showing a second form of defective semi-finished head.

The present invention involves improvements in commercial forms of cold-heading machines for forming screw blanks. Such machines are built generally in accordance with the disclosure in U. S. Patent 386,091 to Rogers, July 10, 1888.

It is therefore not deemed necessary to show herein more than the parts directly affected by the improvements.

In such a cold heading machine a stationary anvil section 10 opposes a reciprocating gate or cross-head 11. Mounted in the stationary part is a fixed die member or block 12 having a longitudinal aperture 13 therethrough to closely fit and guide the wire 14 from which the blank is formed. This wire is intermittently fed through the opening 13 a distance just sufficient to provide an adequate amount of material to form a head thereon of the size desired for the particular screw being made. The wire passes through a perforated guide 15 and between the two gripping members 16 and 17, the upper one 16 of which is stationary and the lower one 17 of which is shackled to a link 18 whereby it is slidably moved into and out of engagement with the wire as required. When the wire is tightly engaged by the gripping members it is held stationary so that the heading operation can be satisfactorily performed.

The gate 11 is mounted for reciprocation in two paths at right angles to each other, the first motion being parallel to the axis of the wire and resulting from the movement of a cross head in rectilinear guides under the action of any suitable source of power. The second path of movement as viewed in Figure 1 is vertical to present successively a plurality of punches to the wire in the die, each of which acts on it under the action of the first motion.

The present invention deals particularly with the formation of screw blanks by two strokes of the gate 11. On the first stroke the primary or upset punch 20 engages the protruding end of the wire 14 and upsets it into what may be termed a semi-finished head. In accordance with the type of screw, the confronting die and punch faces are appropriately shaped. The screw to be formed by the die and punches shown is of the so-called oval headed type, the bottom being formed to fit in a counter sink and for that reason the face of the die has a conical recess 22 and the face of the punch 20 a concave recess 23. The first stroke of the gate produces a head somewhat like that shown in Figure 1 which does not extend completely to the edges of the conical recess 22.

On the second stroke of the cross head, when the punch 21 comes into play, the semi-finished head is brought down to its final size and shape so that it completely fills the recess 22 in the die face, and the corresponding recess 24, in the face of punch 21.

In the manufacture of the conventional form of screw blank, these two heading operations are attended with no particular difficulties for the head is solid and the customary kerf is subsequently formed on a slotting machine.

In accordance with the present invention, however, it is desired to pierce or recess the head simultaneously with the finishing punch stroke to provide a screw of the type shown, for instance, in the patent to Frearson 308,246 or the patent to Phillips et al 2,046,839, and here the problem is complicated by the presence, in the center of the cavity 24 of the second punch of the piercing nub 25.

This nub, it has been found, is best formed integral with the head shaping portion of the punch in order to prevent any of the metal of the blank from flowing into the joint between the two parts. Obviously the metal of the punch must be very hard in order to produce the screw blank head by cold forging and this hardness makes it sufficiently brittle to be subject to damage under certain conditions.

Commercial forms of cold-heading machines are designed and built with a clearance of from 8–10 thousandths of an inch between the sides of the reciprocating cross head and the sliding ways in the frame of the machine to allow for an adequate film of lubricant and to prevent seizing and scoring when the machine is at its operating temperature. This permits slight inequalities in the wire, such as variations in hardness and the like, to deflect the upsetting punch sufficiently to produce a semi-finished head of slight eccentricity such as shown in quite exaggerated form in Figure 2. In other words, the recess 22 in the die face is not uniformly filled with the metal of the semi-finished head.

Other conditions may contribute to the formation of such partially defective heads and include cracks or weak portions in the wire which open up when the head is upset as shown at 26 in Figure 4. Such cracks are usually found to be radial or spiral and occur in portions of the wire which are almost impossible to inspect.

On the second stroke of the cross head and gate 11, when the second or finishing punch 21 is presented to the semi-finished head there is a strong tendency to form the eccentric head, such as shown in Figure 2, back into true concentricity because there is just sufficient metal to fill the two confronting recesses in the die and punch. This means that a certain large portion of the metal of the semi-finished head must be flowed laterally and there is thus produced a decided stress tending to shear or break off the piercing nub 25.

Under conditions such as shown in Figure 4 and described in connection therewith the tendency of the piercing nub is to follow the fault or crack in the head and be deflected from its normal course or given a partial rotation.

To prevent the various difficulties attendant upon the forming and piercing of at least partially defective semi-finished heads resulting from the first operation, it has been found desirable to mount the second punch so that it can float or have universal movement, within restricted limits, and follow deflecting metal, faults or cracks in the upset head so as not to be strained and sheared off by the actions described. For this purpose a satisfactory form of construction has been found to be that shown in Figure 1 of the drawing where the punch 21 is carried by an adaptor 27 suitably secured and mounted in the gate 11 and having the cylindrical aperture 28 in its front face providing a shoulder 29 for the seating of the base of the punch 21 which is preferably of cylindrical form and of a diameter several thousandths of an inch less than the opening 28. The punch is conveniently held in its adaptor by a pin 30 fitting tightly in a hole drilled in the adaptor but only loosely engaging in the semi-circular channel 31 in the periphery of the punch. This construction permits the punch to float in respect to the adaptor so that it can rotate, cant, move transversely, or in fact have universal freedom within limits so that it can follow flowing metal or defects in the upset head sufficiently to avoid fracturing the nub at its junction with the body portion of the punch which forms the finished surface on the head.

It has been found that operations with this type of mounting for the punch have increased the life thereof so that now such punches on one particular size of screw are capable of forming several hundred gross of screw blanks, whereas with the old and rigid construction, less than 100 gross could be formed before the punch required renewing.

The invention has been shown in connection with punches and dies for oval headed screws, but it is obvious that with appropriate changes in the shapes of the punch and die recesses, any of the well-known forms of screw heads can be formed with equal facility.

Having thus described the invention, what is claimed as new and desired to be secured by Letters Patent is:

1. The method of cold heading and recessing screw blanks comprising, forcing a length of wire stock through an opening in a die until the end thereof protrudes sufficiently to be upset against the die by a heading punch, upsetting the protruding end of the wire against the die to form a head thereon of semi-finished shape, then further upsetting and piercing said head to form it to final shape between a second punch and the die, the second operation being effected with a self-centering punch.

2. The method of cold heading and recessing screw blanks comprising projecting a length of wire stock through an opening in a die, upsetting the protruding end against the die to form a semi-finished head on the wire, then simultaneously piercing said head and shaping it to final form between said die and a reciprocable punch, and supporting said punch for limited universal movement.

3. The method of cold heading and recessing screw blanks comprising projecting a length of wire stock through an opening in a die, upsetting the protruding end against the die to form a semi-finished head on the wire, of predetermined volume, then simultaneously piercing said head and shaping it to final form between said die, and a punch reciprocable axially of the wire and mounting said punch for limited lateral movement to compensate for eccentric flow of metal in the head.

4. The method of cold heading and recessing screw blanks comprising projecting a length of wire stock through an opening in a die, upsetting the protruding end against the die to form a semi-finished head on the wire of predetermined volume, then simultaneously piercing said head and shaping it to final form between said die, and a one-piece piercing and shaping punch mounting said punch for reciprocation axially of said wire and laterally of the axis of the wire and restricting lateral movement to only several thousandths of an inch.

5. In a screw blank making machine of the type having a die with an opening therethrough, with means for intermittently feeding a length of wire through the opening, with means for upsetting the end of the wire against the die to form a semi-finished head, and with means for further upsetting said head to a finished form against said die and simultaneously piercing and forming a screw driver receiving recess therein, the improvement which consists in mounting the punch used for the finishing and piercing of said head so that it is capable of limited movement transversely to the axis of the wire when necessary because of any fault or eccentricity of the semi-finished head.

6. In a screw blank making machine of the type having a die with an opening therethrough, with means for intermittently feeding a length of wire through the opening, with means for upsetting the end of the wire against the die to form a semi-finished head, and with means for further upsetting said head to a finished form against said die and simultaneously piercing and forming a screw driver receiving recess therein, the improvement which consists in mounting the punch used for the finishing and piercing of said head so that it is capable of limited universal movement relative to the axis of the wire to prevent damage to the piercing portion of the punch.

7. In a screw blank making machine of the type having a die with an opening therethrough, with means for intermittently feeding a length of wire through the opening, with means for upsetting the end of the wire against the die to form a semi-finished head, and with means for further upsetting said head to a finished form against said die and simultaneously piercing and forming a screw driver receiving recess therein, the improvement which consists in providing a floating mounting for the punch used for the finishing and piercing of said head so that it is capable of limited universal movement in relation to the semi-finished head during engagement with said head.

8. A punch mounting for a screw heading machine comprising a punch having a working end and a substantially cylindrical body, an adaptor for said punch having a cylindrical recess of less depth than the length of the punch body and having a diameter several thousandths of an inch greater than that of said body, a transverse groove in the surface of said body, and a pin extending tightly through an opening in said adaptor and loosely fitting said groove.

9. A punch mounting for a screw heading machine comprising a punch having a body and a working end, an adaptor having a recess to receive a portion of said body spaced from said working end, said recess providing a clearance of several thousandths of an inch for said body, and means loosely securing said body in said recess.

10. A punch mounting for a screw heading machine comprising a punch having a body and a working end, an adaptor having a recess to receive a portion of said body spaced from said working end, said recess providing a clearance of several thousandths of an inch for said body, and means holding said body in said recess for universal movement in respect to said adaptor within the limits of said clearance.

JOSEPH JOHN TOMALIS.